(12) United States Patent
Kim

(10) Patent No.: US 10,717,061 B1
(45) Date of Patent: Jul. 21, 2020

(54) FLUIDIZED BED REACTOR SYSTEM ALLOWING PARTICLE SAMPLING DURING AN ONGOING REACTION

(71) Applicant: X ENERGY, LLC, Rockville, MD (US)

(72) Inventor: Howard Taery Kim, Knoxville, TN (US)

(73) Assignee: X ENERGY, LLC, Rockville, MD (US)

( * ) Notice: Subject to any disclaimer, the term of this patent is extended or adjusted under 35 U.S.C. 154(b) by 0 days.

(21) Appl. No.: 16/453,571

(22) Filed: Jun. 26, 2019

(51) Int. Cl.
*B01J 8/18* (2006.01)
*B01J 8/00* (2006.01)

(52) U.S. Cl.
CPC .......... *B01J 8/1827* (2013.01); *B01J 8/007* (2013.01); *B01J 8/1809* (2013.01); *B01J 2208/0015* (2013.01); *B01J 2208/00212* (2013.01); *B01J 2208/00938* (2013.01); *B01J 2208/00982* (2013.01); *B01J 2208/00991* (2013.01)

(58) Field of Classification Search
CPC ........ B01J 8/1827; B01J 8/1809; B01J 8/007; B01J 2208/00938; B01J 2208/00982; B01J 2208/00991; B01J 2208/00212; B01J 2208/0015
USPC ................................................. 422/129, 139
See application file for complete search history.

(56) References Cited

U.S. PATENT DOCUMENTS

| | | | |
|---|---|---|---|
| 3,034,657 A * | 5/1962 | Newmyer | A47F 7/28 211/77 |
| 4,543,399 A | 9/1985 | Jenkins, III et al. | |
| 4,552,203 A | 11/1985 | Chrysostome et al. | |
| 4,828,581 A | 5/1989 | Feldmann et al. | |
| 4,973,458 A | 11/1990 | Newby et al. | |

(Continued)

OTHER PUBLICATIONS

Tannous, "Entrainment of Heterogeneous Particles from Gas-Fluidized Bed", Particulate Science and Technology, 26: pp. 222-234 (2008).

*Primary Examiner* — Huy Tram Nguyen
(74) *Attorney, Agent, or Firm* — Kramer Amado, P.C.

(57) ABSTRACT

A fluidized gas reactor includes a system for preventing a fluidizing gas comprising a reactant from premature reaction. The fluidized gas reactor includes a reaction chamber including a particle bed; a gas distribution plate having a plurality of openings therethrough, wherein each opening opens into the reaction chamber; and a plurality of vertical fluidizing gas inlet tubes, each of the fluidizing gas inlet tubes being in fluid communication with one of the openings in the gas distribution plate. Each fluidizing gas inlet tube is configured to receive a fluidizing gas and transport the fluidizing gas to the reaction chamber. A fluidizing gas source provides a stream of the fluidizing gas to the fluidizing gas inlet tubes. A coolant system prevents the fluidizing gas from undergoing reaction before entering the reaction chamber. The coolant system has a fluid inlet; a coolant flow path in fluid communication with the fluid inlet, the coolant flow path being configured to cool each fluidizing gas inlet tube; and a fluid outlet in fluid communication with the coolant flow path. Each fluidizing gas inlet tube may include a particle outlet and a valve system, where the valve system allows the fluidizing gas flow to the fluidizing gas inlet tubes to be stopped; and allows recovery of particles from the particle bed while the fluidizing gas flow is stopped.

20 Claims, 9 Drawing Sheets

(56) References Cited

U.S. PATENT DOCUMENTS

| | | | |
|---|---|---|---|
| 5,453,471 | A | 9/1995 | Bernier et al. |
| 5,798,137 | A | 8/1998 | Lord et al. |
| 6,025,448 | A | 2/2000 | Swindoll et al. |
| 7,553,466 | B2 | 6/2009 | Herold et al. |
| 8,314,198 | B2 | 11/2012 | Dumas et al. |
| 8,875,728 | B2 * | 11/2014 | Sansegundo-Sanchez ............... B01J 8/1827 137/334 |
| 8,876,942 | B2 | 11/2014 | Force et al. |
| 2008/0267834 | A1 * | 10/2008 | Kim ............ B01J 3/046 422/139 |
| 2008/0299291 | A1 * | 12/2008 | Weidhaus ............ C01B 33/027 427/8 |

* cited by examiner

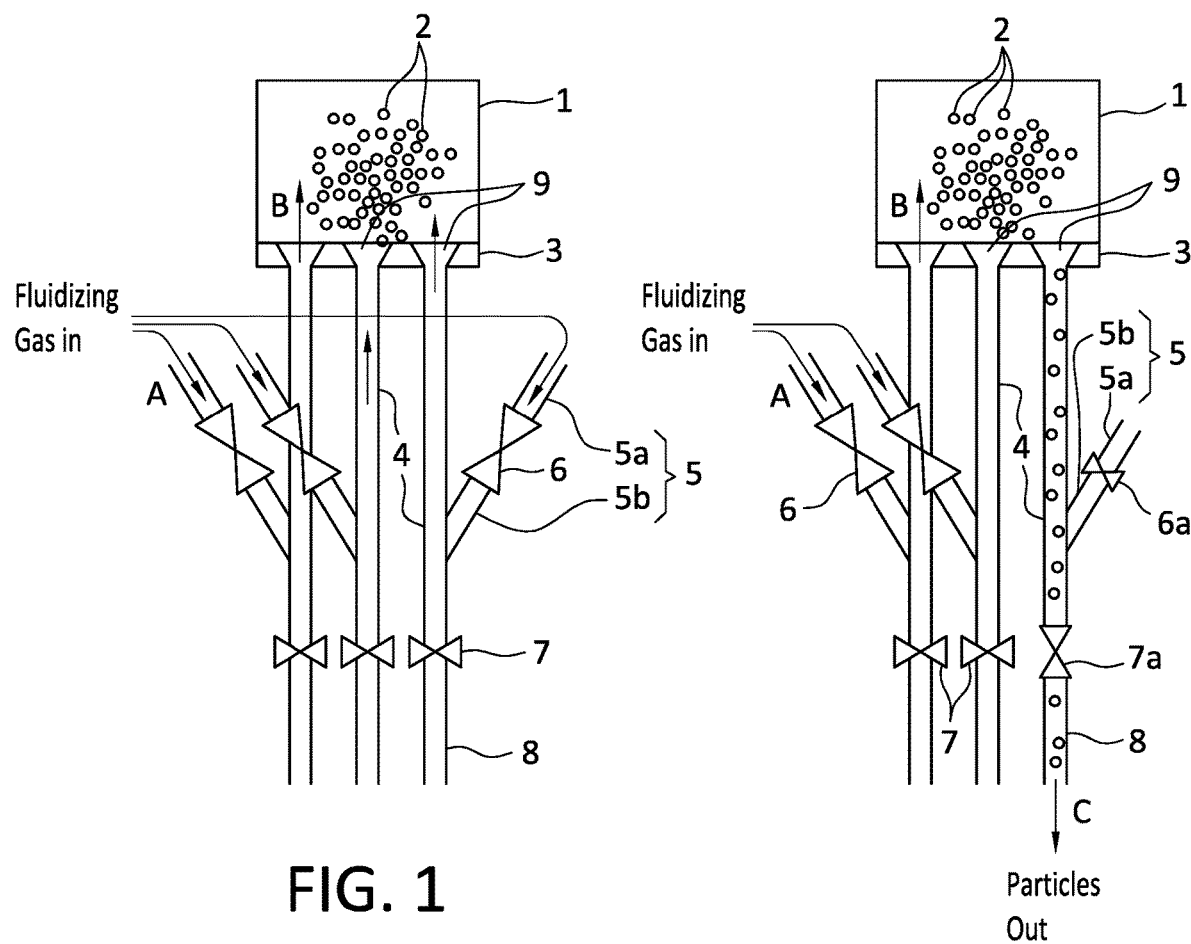

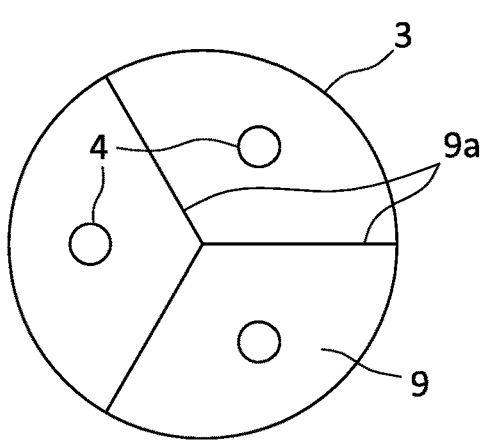
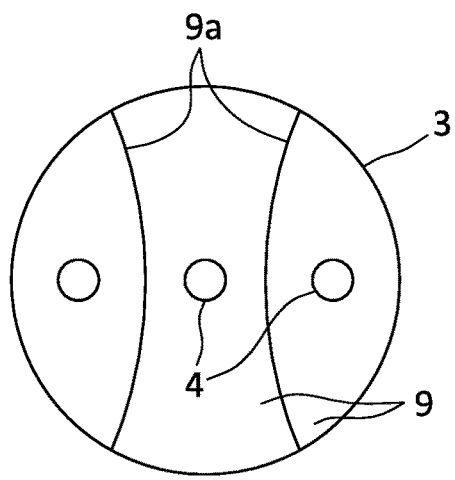
FIG. 10A            FIG. 10B
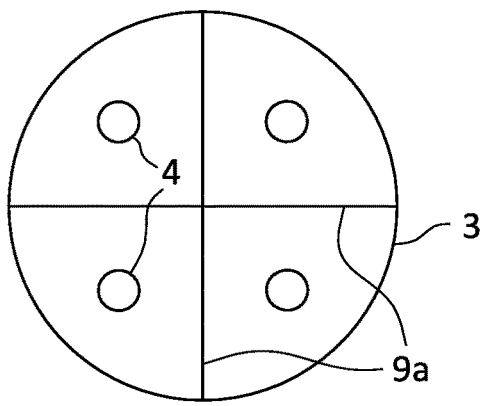
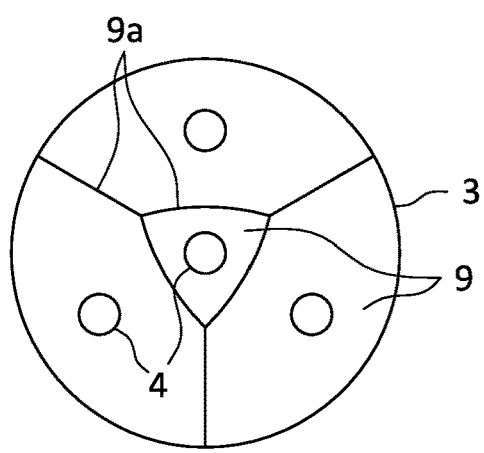
FIG. 10C            FIG. 10D
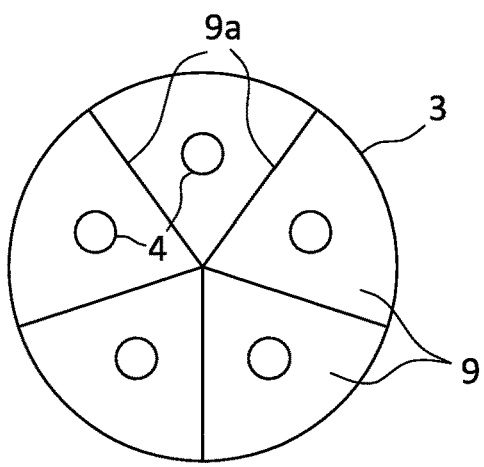
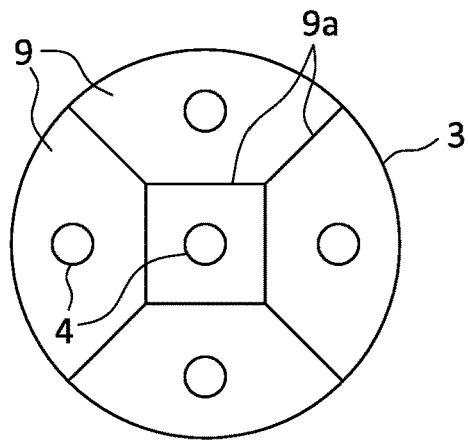
FIG. 10E            FIG. 10F

FLUIDIZED BED REACTOR SYSTEM ALLOWING PARTICLE SAMPLING DURING AN ONGOING REACTION

BACKGROUND

1. Field of the Disclosure

This disclosure relates generally to fluidized bed reactors. In various embodiments, this disclosure relates generally to a system for recovering a particle sample from a fluidized bed reactor without interrupting an ongoing reaction. In various embodiments, this disclosure relates to a system for providing a coolant to fluidized gas supply tubing in a fluidized bed reactor.

2. Description of Related Art

It is known to use a fluidized bed reactor system used in connection with a locally cooled gas distribution plate, where cooling channels allow transport of cooling fluid through a jacket configured around a gas injector. The locally cooled gas distribution plate helps prevent wall deposits around the orifices of the gas distribution plate. However, the gas injectors only allow gas transport from a plenum chamber into a reaction chamber, and do not allow recovery of a particle sample while gas injection continues. Further, the gas injectors cool the fluidizing gas at or near the gas distribution plate, and may not effectively prevent reaction of reactant gases within a plenum chamber.

It is also known to use a fluidized bed reactor with a fluidizing gas flow through a through an injector, and a particle withdrawal passage near the injector, where a gas flow into the reactor may be used to prevent or reduce particle flow through the particle withdrawal passage. A fluidizing reactant gas may be introduced into a bottom of a reactor, and particle withdrawal may be initiated by reducing the gas flow through the particle withdrawal passage. However, this only allows particle sampling from a single point in the fluidized bed. It would be desirable to selectively allow particle withdrawal from any of multiple points in the fluidized bed.

This disclosure describes a system for recovering a particle sample from a fluidized bed reactor without interrupting an ongoing reaction. This disclosure further describes a system for providing a coolant to fluidized gas supply tubing in a fluidized bed reactor. These systems can be achieved by the various embodiments disclosed herein. These embodiments are not intended to be exhaustive or limiting of the possible advantages which can be realized based on the teachings of the present disclosure. Various objects and advantages of the various embodiments disclosed herein will be apparent from the description herein or can be learned from practicing the various embodiments, both as described herein or as modified in view of any variation that may be apparent to those skilled in the art. Accordingly, the present invention resides in the novel methods, arrangements, combinations, and improvements herein disclosed in various embodiments.

SUMMARY

In light of the present need for improved methods of removing entrained particles from an exhaust gas stream, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments disclosed herein relate to a fluidized bed reactor, configured to allow particle sample recovery without interrupting an ongoing reaction. In various embodiments, the fluidized bed reactor includes a reaction chamber including a particle bed; and a gas distribution plate having a plurality of openings therethrough, wherein each opening opens into the reaction chamber. The reactor also includes a plurality of fluidizing gas inlet tubes, each of the fluidizing gas inlet tubes being in fluid communication with one of the openings in the gas distribution plate, wherein each fluidizing gas inlet tube is configured to receive a fluidizing gas and transport the fluidizing gas to the reaction chamber through the gas distribution plate. A fluidizing gas source is configured to provide a stream of the fluidizing gas to the fluidizing gas inlet tubes. Various embodiments of the reactor include a plurality of particle outlets, each particle outlet being positioned in one of the fluidizing gas inlet tubes. The fluidizing gas source is configured to selectively stop the stream of the fluidizing gas to any one of the fluidizing gas inlet tubes; and each particle outlet is configured to receive particles from the particle bed while the stream of the fluidizing gas to a corresponding fluidizing gas inlet tube is stopped.

In various embodiments, the fluidizing gas source is configured to selectively stop the stream of the fluidizing gas to any one of the fluidizing gas inlet tubes without interrupting the stream of the fluidizing gas to the other fluidizing gas inlet tubes. In various embodiments, the fluidizing gas source comprises a plurality of fluidizing gas supply tubes, each fluidizing gas supply tube being in fluid communication with a corresponding fluidizing gas inlet tubes, where each fluidizing gas supply tube comprises a valve configured to selectively stop the stream of the fluidizing gas to the corresponding fluidizing gas inlet tube.

In various embodiments, the fluidizing gas source comprises a plurality of fluidizing gas supply tubes, with each fluidizing gas supply tube being in fluid communication with a corresponding fluidizing gas inlet tube. Each fluidizing gas supply tube comprises a first valve which is configured to adopt a first position, wherein:

the first position selectively stops the stream of the fluidizing gas from flowing to the corresponding fluidizing gas inlet tube; and wherein the corresponding fluidizing gas inlet tube comprises a second valve configured to allow particles from the particle bed to flow to the particle outlet when the first valve is in the first position. Similarly, in various embodiments the first valve is also configured to adopt a second position, wherein the second position permits the stream of the fluidizing gas to flow to the corresponding fluidizing gas inlet tube; and the second valve is configured to prevent particles from the particle bed from flowing to the particle outlet when the first valve is in the second position. In various embodiments, the first and second valves either permit the stream of the fluidizing gas to flow to the corresponding fluidizing gas inlet tube; or allow particles from the particle bed to flow to the particle outlet through the fluidizing gas inlet tube; fluidizing gas flow and particle flow through the fluidizing gas inlet tube are not simultaneously permitted.

In various embodiments, the fluidized gas reactor includes a coolant system including a fluid inlet; a coolant flow path in fluid communication with the fluid inlet, the coolant flow path being configured to cool each fluidizing gas inlet tube; and a fluid outlet in fluid communication with the coolant flow path. The fluid inlet may include an inlet manifold. The coolant flow path may include a plurality of cooling jackets, wherein each cooling jacket surrounds one of the fluidizing gas inlet tubes; and each cooling jacket is in fluid communication with the inlet manifold. The fluid outlet may include an outlet manifold in fluid communication with each cooling jacket.

In various embodiments, the fluidized gas reactor includes a coolant system including a fluid inlet; a coolant flow path in fluid communication with the fluid inlet; and a fluid outlet in fluid communication with the coolant flow path. The coolant flow path may include a plurality of cooling jackets, where each cooling jacket surrounds one of the fluidizing gas inlet tubes; and the coolant flow path may be configured to provide coolant flow from the fluid inlet to the fluid outlet, where the coolant flows sequentially through the plurality of cooling jackets. In various embodiments, the coolant flow path includes a plurality of cooling jackets, where each cooling jacket surrounds one of the fluidizing gas inlet tubes; and the coolant flow path is configured to provide coolant flow from the fluid inlet to the fluid outlet, where the coolant flows in parallel through the plurality of cooling jackets.

The fluidized gas reactor may, in some embodiments, include a disentrainment chamber above the reaction chamber; and a conical velocity reduction chamber therebetween. In various embodiments, a diameter of the disentrainment chamber is from 1.5 to 10 times greater, from 2 to 5 times greater, from 2.25 to 4 times greater, or about 2.5 times greater than a diameter of the reaction chamber.

In various embodiments, the fluidized gas reactor includes a reaction chamber having a graphite wall configured to be heated to between about 600° C. and about 2200° C., or 800° C. and about 2000° C., or 1250° C. and about 1800° C. The fluidized gas reactor may include a reaction chamber having a graphite wall configured to be heated to between about 600° C. and about 2200° C.; and at least one of a velocity reduction chamber and a disentrainment chamber having a graphite wall configured to be heated to between about 600° C. and about 2200° C.

Various embodiments disclosed herein are directed to a fluidized gas reactor, including a reaction chamber having a particle bed; a gas distribution plate having a plurality of openings therethrough, where each opening opens into the reaction chamber; and a plurality of fluidizing gas inlet tubes, each of the fluidizing gas inlet tubes being in fluid communication with one of the openings in the gas distribution plate. Each fluidizing gas inlet tube may be configured to receive a fluidizing gas and transport the fluidizing gas to the reaction chamber. The reactor may include a fluidizing gas source, the fluidizing gas source being configured to provide a stream of the fluidizing gas to the fluidizing gas inlet tubes; and a coolant system. In various embodiments, the coolant system includes a fluid inlet; a coolant flow path in fluid communication with the fluid inlet, the coolant flow path being configured to cool each fluidizing gas inlet tube; and a fluid outlet in fluid communication with the coolant flow path.

Various embodiments disclosed herein are directed to a fluidized gas reactor configured to allow particle sample recovery without interrupting an ongoing reaction, including a reaction chamber having a particle bed; a gas distribution plate having a plurality of openings therethrough; and a plurality of fluidizing gas inlet tubes in fluid communication with the one of the conical in the gas distribution plate. In various embodiments, each fluidizing gas inlet tube has a gas inlet opening and a particle outlet opening. A fluidizing gas source may be configured to provide a stream of a fluidizing gas to the gas inlet openings in the fluidizing gas inlet tubes. In various embodiments, the reactor includes a valve system configured to selectively stop flow of the fluidizing gas to the gas inlet opening in any one of the fluidizing gas inlet tubes; and allow flow of particles from the particle bed to the particle outlet opening while flow of the fluidizing gas to the gas inlet opening is stopped. The valve system may be configured to selectively stop flow of the fluidizing gas to the gas inlet opening in any one of the fluidizing gas inlet tubes, without interrupting flow of the fluidizing gas to the gas inlet opening in other fluidizing gas inlet tubes. The valve system may be configured to prevent flow of particles from the particle bed to the particle outlet opening unless flow of the fluidizing gas to the gas inlet opening is stopped.

BRIEF DESCRIPTION OF THE DRAWINGS

In order to better understand various exemplary embodiments, reference is made to the accompanying drawings, wherein:

FIG. 1 shows a fluidized bed reactor with a plurality of gas inlet tubes, each configured to carry a fluidizing gas into a reaction chamber;

FIG. 2 shows a fluidized bed reactor with a plurality of gas inlet tubes according to FIG. 1, where one gas inlet tube is configured to allow collection of a particle sample from a fluidized bed;

FIGS. 10A to 10F show various arrangements of gas inlet tubes in conjunction with a gas distribution plate as shown in FIG. 9.

DETAILED DESCRIPTION

Figure 3:
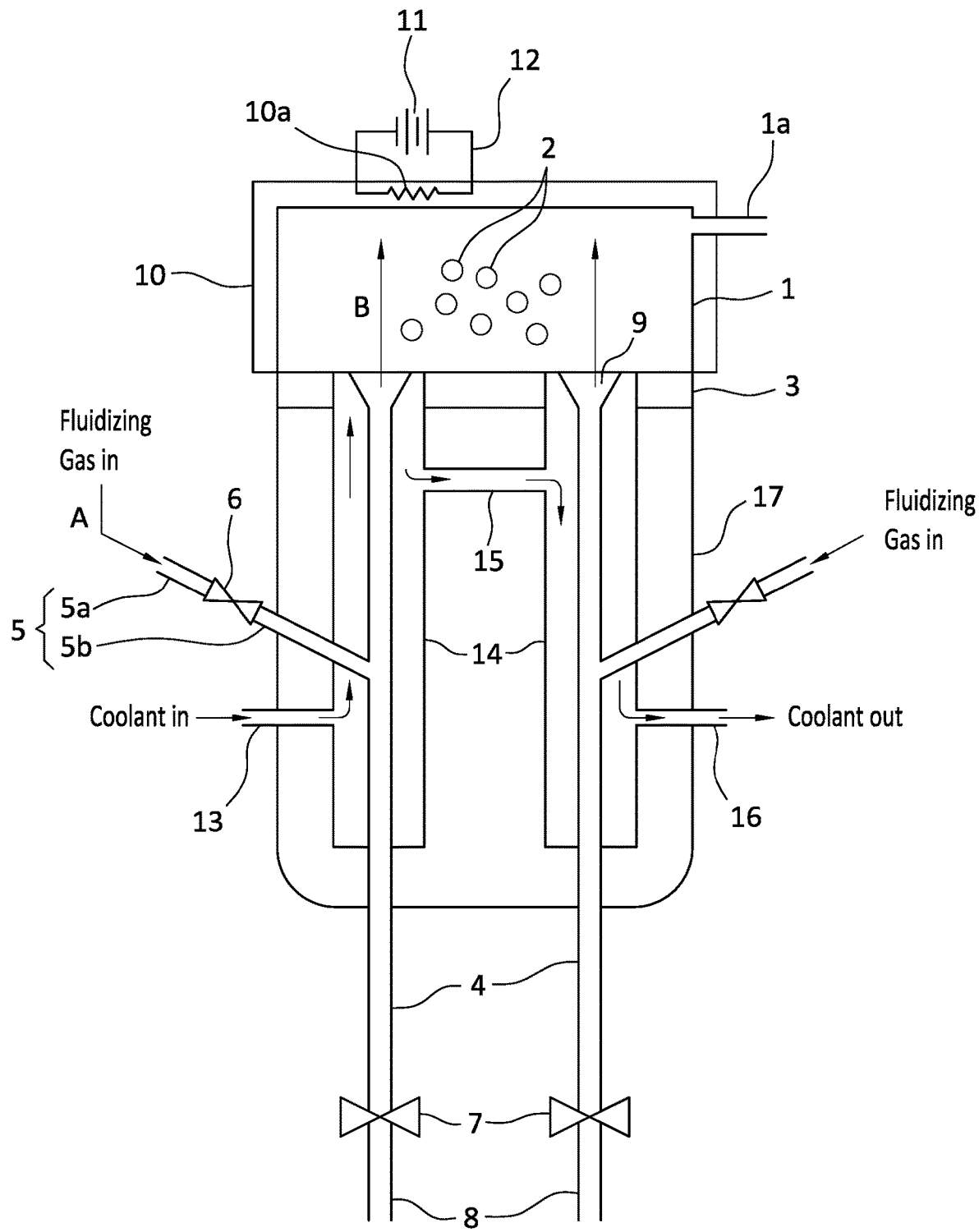
FIGS. 3 to 5 show various embodiments of a fluidized bed reactor with a plurality of gas inlet tubes according to FIG. 1, where the gas inlet tubes are provided with a coolant system.

Referring now to the drawings, in which like numerals refer to like components or steps, there are disclosed broad aspects of various exemplary embodiments. FIG. 1 shows a fluidized bed reactor configured to allow particle sample recovery without interrupting an ongoing reaction.

1. Particle Sampling During Fluidization

The fluidized bed reactor of FIG. 1 includes reaction chamber 1, with a bed of particles 2 therein. A gas distribution plate 3 forms a floor of reaction chamber 1 and has conical gas inlet openings 9 therethrough. A plurality of fluidizing gas inlet tubes 4, which may be vertically arranged, carry a fluidizing gas into reaction chamber 1, with each of the fluidizing gas inlet tubes being in fluid communication with one of the openings 9 in the gas distribution plate 3. The fluidizing gas is carried to each fluidizing gas inlet tube 4 from a fluidizing gas source through a fluidizing gas supply tube 5. Each fluidizing gas supply tube 5 is in fluid communication with a corresponding fluidizing gas inlet tube 4 and is configured to provide a stream of the fluidizing gas to the corresponding fluidizing gas inlet tube 4. The fluidized bed reactor of FIG. 1 also includes a plurality of particle outlets 8, each particle outlet 8 being positioned in, or connected with, one of the fluidizing gas inlet tubes 4.

In various embodiments, the fluidizing gas source is configured to selectively stop the stream of the fluidizing gas to any one of the fluidizing gas inlet tubes 4. Each particle outlet is configured to receive particles from the particle bed while the stream of the fluidizing gas to a corresponding fluidizing gas inlet tube is stopped. Referring to FIG. 1, each particle outlet 8 is joined to one of the fluidizing gas inlet tubes 4 through a valve 7, where each valve 7 is closed. Each fluidizing gas supply tube 5 is connected to a one of the fluidizing gas inlet tubes 4 through a valve 6. In FIG. 1, each valve 6 is open, and each valve 7 is closed. The fluidizing gas is supplied through tubes 5 to fluidizing gas inlet tubes 4 in the direction of arrow A, where the fluidizing gas travels from a first section 5a of fluidizing gas supply tube 5 through valve 6, and then to fluidizing gas inlet tube 4 through a second section 5b of fluidizing gas supply tube 5. The fluidizing gas then travels through fluidizing gas inlet tubes 4 in the direction of arrow A, entering the reaction chamber 1 through openings 9, and fluidizing the bed of particles 2.

In various embodiments, the fluidizing gas includes a reactant gas which deposits a carbon or ceramic coating on particles 2. In such cases, it is desirable to be able to obtain a sample of the particles in the bed to analyze the coating layer. It is further desirable to be able to obtain a sample of the particles in the bed without interrupting the deposition reaction. The system of valves in the apparatus of FIG. 1 allows obtaining such a sample, as shown in FIG. 2.

In FIG. 2, the fluidizing gas is supplied through two tubes 5 to fluidizing gas inlet tubes 4 in the direction of arrow A through valves 6, and then to fluidizing gas inlet tube 4. The fluidizing gas then travels through fluidizing gas inlet tubes 4 in the direction of arrow A, entering the reaction chamber 1 through openings 9, and fluidizing the bed of particles 2. In the fluidizing gas inlet tube 4 receiving a fluidizing gas from tubes 5, valves 7 are closed. As shown in FIG. 2, in a third fluidizing gas inlet tube 4, no fluidizing gas is received, because valve 6a (corresponding to one of valves 6 in FIG. 1), is closed, blocking flow of fluidizing gas from tube 5a. In this third fluidizing gas inlet tube 4, valve 7a between particle outlet 8 and fluidizing gas inlet tube 4 is opened. This allows a sample of particles 2 in reaction chamber 1 to fall through fluidizing gas inlet tube 4 to particle outlet 8 in the direction of arrow C, allowing recovery of a sample of the particles in the fluidized bed from particle outlet 8. Since fluidizing gas continues to enter the reaction chamber through the other tubes 4 in the direction of arrow B, recovery of the particle sample does not interrupt an ongoing deposition reaction in reaction chamber 1. Further, as fluidizing gas enters the reaction chamber through tubes 4 in the direction of arrow B, positive pressure in the reaction chamber may assist in particle recovery by blowing particles in the direction of arrow C.

FIG. 3 shows a fluidized bed reactor with reaction chamber 1 with a bed of particles 2 therein. A gas distribution plate 3 has conical gas inlet openings 9 therethrough. A plurality of fluidizing gas inlet tubes 4 (two shown in FIG. 3, although more may be used) carry a fluidizing gas into reaction chamber 1 in the direction of arrow B. The fluidizing gas is carried to each fluidizing gas inlet tube 4 from a fluidizing gas source through a fluidizing gas supply tube 5. Each fluidizing gas supply tube 5 is in fluid communication with a corresponding fluidizing gas inlet tube 4 and is configured to provide a stream of the fluidizing gas to the corresponding fluidizing gas inlet tube 4. The fluidized bed reactor of FIG. 1 also includes a plurality of particle outlets 8, each particle outlet 8 being positioned in, or connected with, one of the fluidizing gas inlet tubes 4.

In FIG. 3, reaction chamber 1 has a wall 10 of a conductive material, such as a conductive carbon, e.g., graphite. A graphite wall of a reaction chamber is electrically resistive (represented in FIG. 3 as resistor 10a). A power supply 11 carries current to the resistive graphite wall 10 through circuit 12, heating the reaction chamber 1 to a temperature of between about 600° C. and about 2200° C.

In various embodiments, a variety of materials may be deposited on core particles in the reaction chamber. Fluidized bed chemical vapor deposition (FBCVD) may be used to deposit materials in monocrystalline, polycrystalline, and amorphous coatings on core fluidized bed particles. These coatings include silicon, silicon dioxide, silicon carbide, silicon nitride, silicon oxynitride, pyrolytic carbon, diamond, graphite, fluorocarbons, tungsten, titanium nitride, and high-k dielectrics.

In various embodiments, pyrolytic carbon (PyC) may be deposited on core particles by FBCVD at deposition temperatures from 1250 to 1450° C., with acetylene or acetylene/propylene mixtures. Silicon may be deposited on core particles by FBCVD, using pyrolytic decomposition of silane followed by deposition of silicon formed onto a fluidized bed at 650° C. Silicon carbide (SiC) may be deposited on a core particle by FBCVD of $CH_3SiCl_3$ using a hydrogen carrier gas at 1500° C.

In various embodiments, core particles may be sequentially coated with multiple layers. For example, nuclear fuel particles may be produced by sequentially coating $UO_2$ core particles. The $UO_2$ particles may be coated with a porous carbon layer by deposition of carbon from ethylene in an inert carrier gas at 1250° C., followed by depositing a dense carbon layer by deposition of carbon from an acetylene/propylene mixture in an inert carrier gas at 1300° C. A silicon carbide layer is deposited on the dense carbon layer by from $CH_3SiCl_3$ using a hydrogen carrier gas at 1500° C. Finally, an outer layer of dense carbon is deposited from an acetylene/propylene mixture in an inert carrier gas at 1300° C. The resulting particles are known as tri iso-structural (TRISO) coated particles.

In various embodiments, a fluidized bed in a fluidized bed reactor according to claim 1 may contain core particles, and a fluidizing gas containing a reactant may flow into the reaction chamber 1 from the various inlet tubes 4 through openings 9 in gas distribution plate 3, as shown in FIG. 1. After allowing the reaction to proceed for a period of time, one valve 6 (shown as valve 6a in FIG. 2) may be closed, cutting off the flow of fluidizing gas through one inlet tube 4, without interrupting fluidization of the particle bed from the flow of the fluidizing gas through the remaining inlet tubes 4. As shown in FIG. 2, one of the valves 7 (shown as valve 7a in FIG. 2), present in the inlet tube connected to valve 6a, is opened, allowing a sample of particles to fall through inlet tube 4 into particle outlet 8 for recovery and analysis. For example, if pyrolytic carbon is deposited on core particles, after allowing the reaction to proceed for a defined period, a sample of carbon-coated particles may be recovered through an inlet tube 4 and a particle outlet 8, without interrupting fluidization through the remaining inlet tubes 4. If, upon analysis, the sample particles are found to have uneven or incomplete coatings, deposition of pyrolytic carbon in the reaction chamber may be allowed to continue. If the particles are found to have complete coatings, deposition may be stopped, and the particles may be recovered.

If particles are sequentially coated with multiple layers, the particles may be sampled without interrupting fluidization and subjected to analysis during each coating step.

2. Coolant Systems

When conducting high temperature FBCVD reactions, heating the interior of reaction chamber 1 to a temperature of between about 600° C. and about 2200° C. may have the undesirable side effect of heating a fluidizing gas in fluidizing gas inlet tube 4 before it enters reaction chamber 1. If the fluidizing gas contains a reactive gas, this can cause deposition of a reaction product, e.g., a carbon or ceramic layer, on the interior of tubes 4, reducing the flow rate of, or completely blocking flow of, the fluidizing gas. This can be reduced or prevented by an appropriate cooling system.

Such a cooling system is shown in FIG. 3. Each fluidizing gas inlet tube 4 enters a plenum chamber 17 under gas distribution plate 3. Each fluidizing gas inlet tube 4 is surrounded by a hollow jacket 14. A coolant fluid, which may be water or steam, enters a first jacket 14 through coolant inlet tube 13. After filling the first jacket 14, the coolant exits jacket 14 through coolant flow tube 15, traveling to the second jacket 14. After filling the second jacket 14, the coolant exits the second jacket 14 through coolant exit tube 16. In the embodiment of FIG. 3, the coolant travels through the cooling jackets 14 in series. This reduces the likelihood of excessive heating of the fluidizing gas inlet tubes 4, or the fluidizing gas in these tubes, by hot gases in the interior of reaction chamber 1. This also reduces the rate at which carbon or ceramic reaction products will deposit on the interior surfaces of tubes 4.

Figure 4:
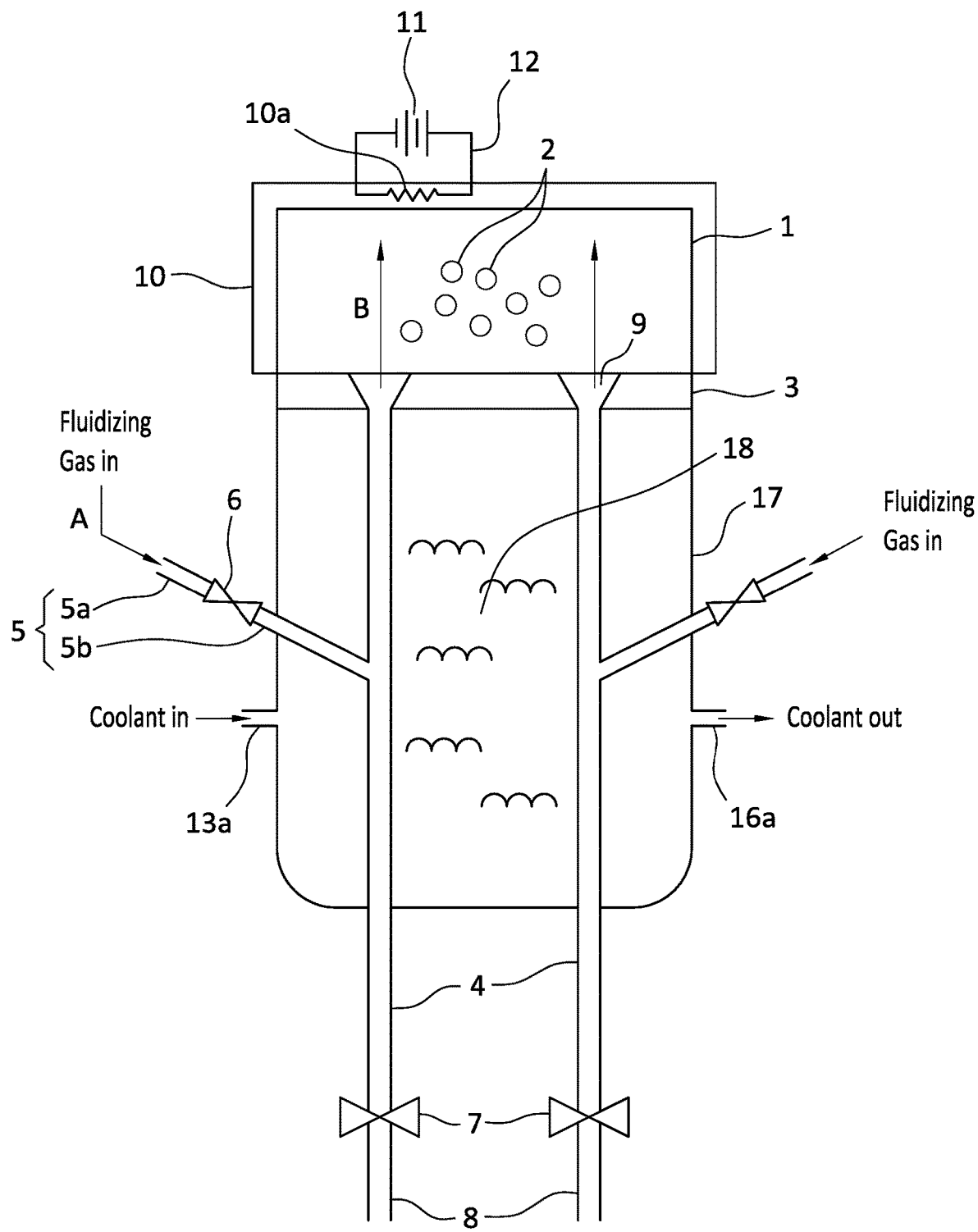

An alternative cooling system is shown in FIG. 4. Each fluidizing gas inlet tube 4 enters a plenum chamber 17 under gas distribution plate 3. A coolant fluid, which is preferably a gas 18 such as steam, enters plenum chamber 17 through coolant inlet tube 13a. After filling the plenum chamber 17, the coolant exits plenum chamber 17 through coolant exit tube 16. This reduces the likelihood of excessive heating of interior of the plenum 17, as well as avoiding excessive heating of a fluidizing gas in in fluidizing gas inlet tube 4, by hot gases in the interior of reaction chamber 1. Again, this reduces the rate at which reaction products deposit on the interior surfaces of tubes 4.

Figure 5:
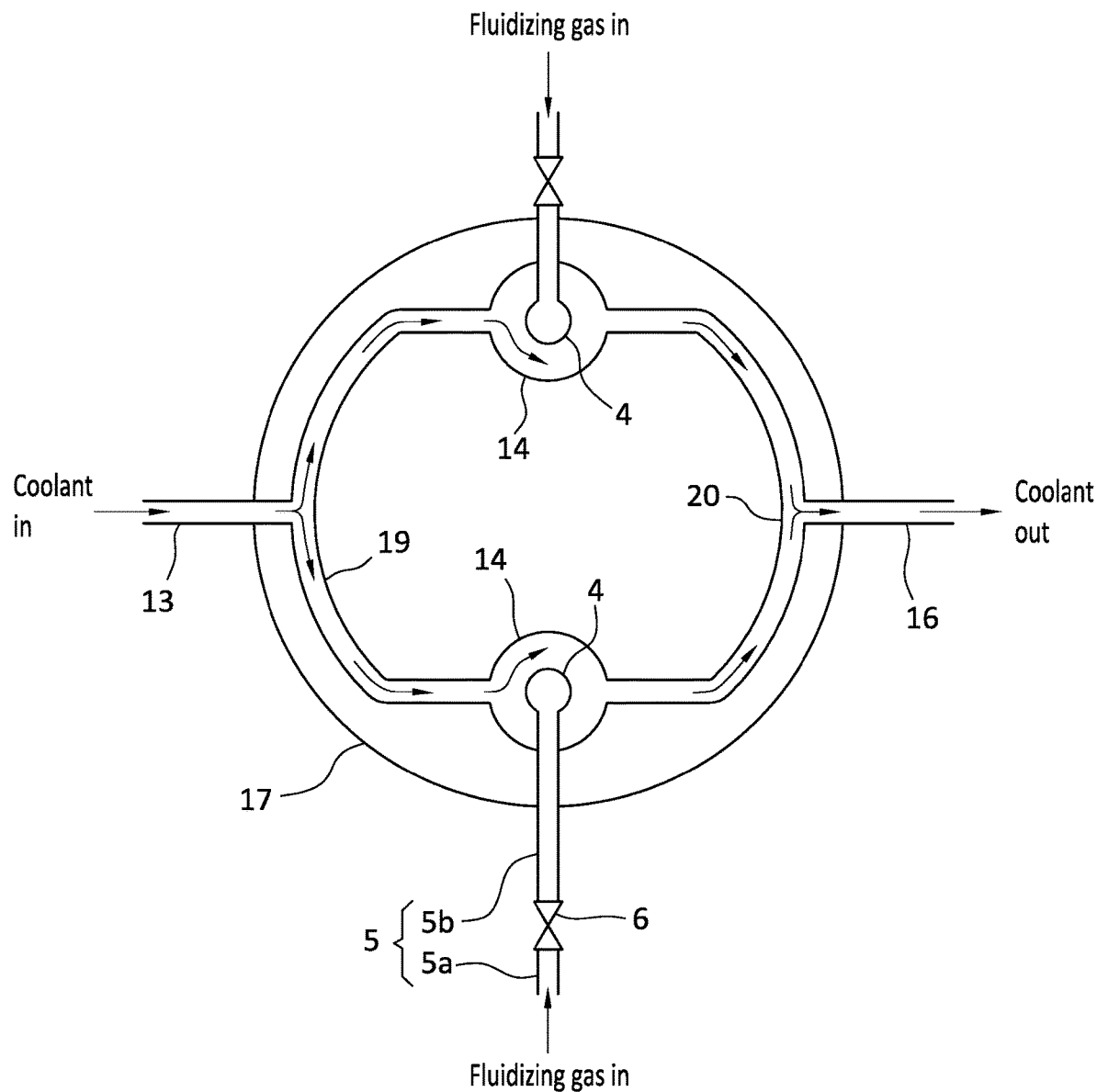

A third cooling system is shown in FIG. 5. Fluidizing gas inlet tube 4 are contained in a plenum chamber 17. Each fluidizing gas inlet tube 4 is surrounded by a hollow jacket 14. A coolant fluid, which may be water or steam, enters an inlet manifold 19 from coolant inlet tube 13. From the inlet manifold 19, coolant flow is distributed to each jacket 14 (two jacketed gas inlet tubes are shown in FIG. 5, although more may be used if desired). After filling the various jackets 14, the coolant exits jackets 14 and enters an exit manifold 20. From the exit manifold 20, the coolant exits the plenum chamber 17 through coolant exit tube 16. In the embodiment of FIG. 5, the coolant travels through the various cooling jackets 14 in parallel. This may allow for more even distribution of heat within the plenum chamber than causing coolant to travel through the various cooling jackets 14 in series. If a coolant travels through cooling jackets in series, the coolant has less time to absorb heat from the fluidizing gas inlet tube 4 as it enters the first cooling jacket than as it enters the last cooling jacket, so the efficiency with which heat is removed from the fluidizing gas inlet tubes 4 decreases as the distance from the coolant inlet increases. If a coolant travels through cooling jackets in parallel, the coolant reaches each cooling jacket 14 roughly simultaneously, so the heat is removed from each fluidizing gas inlet tube 4 with similar efficiency.

As seen in FIGS. 3 and 5, each fluidizing gas supply tube 5 may pass through a cooling jacket 14 before an intersection with a corresponding fluidizing gas inlet tube 4. This cools the fluidizing gas before it enters inlet tube 4, preventing reactant material in the fluidizing gas from reacting to form a solid carbon or ceramic material which builds up at an opening between supply tube 5 and inlet tube 4. This reduces the likelihood of blocking a fluidizing gas flow into inlet tube 4.

Also as seen in FIG. 3, fluidizing gas inlet tubes 4 may extend downwardly beyond a lower surface of plenum chamber 17. For each inlet tube 4, a valve 7 is positioned at a juncture between inlet tube 4 and particle outlet 8, below plenum chamber 17.

As seen in FIG. 3, each fluidizing gas supply tube 5 has a valve 6, allowing flow of a fluidizing gas to be terminated to the corresponding inlet tube 4. Each valve 6 is operated independently. Flow of the fluidizing gas to any one of the inlet tubes 4 may be stopped by closing a valve 6 in the corresponding supply tube 5, without interrupting flow of a fluidizing gas to each remaining inlet tube. After selecting an inlet tube 4 and interrupting fluidizing gas flow to that selected inlet tube, a valve 7 in the lower end of the selected inlet tube is opened, and a sample of particles in the particle bed falls through the selected inlet tube, through opened valve 7, to particle outlet 7. While the particles are collected, they fall through the region of inlet tube 4 cooled by a cooling jacket 5, slowing the rate of reaction between any reactant gas in tube 4 and the particle surface. After the particle sample is collected, valve 7 is closed and valve 6 is opened, restoring flow of the fluidizing gas through the selected inlet tube 4. Thus, this arrangement allows recovery of a particle sample for analysis from a particle outlet 8 connected to a first inlet tube 4, while allowing fluidizing gas to continue flowing into reaction chamber 1 through all remaining inlet tubes. Thus, collection of a particle sample does not interrupt a reaction between a fluidizing gas and a bed of particles in chamber 1.

Figure 6:
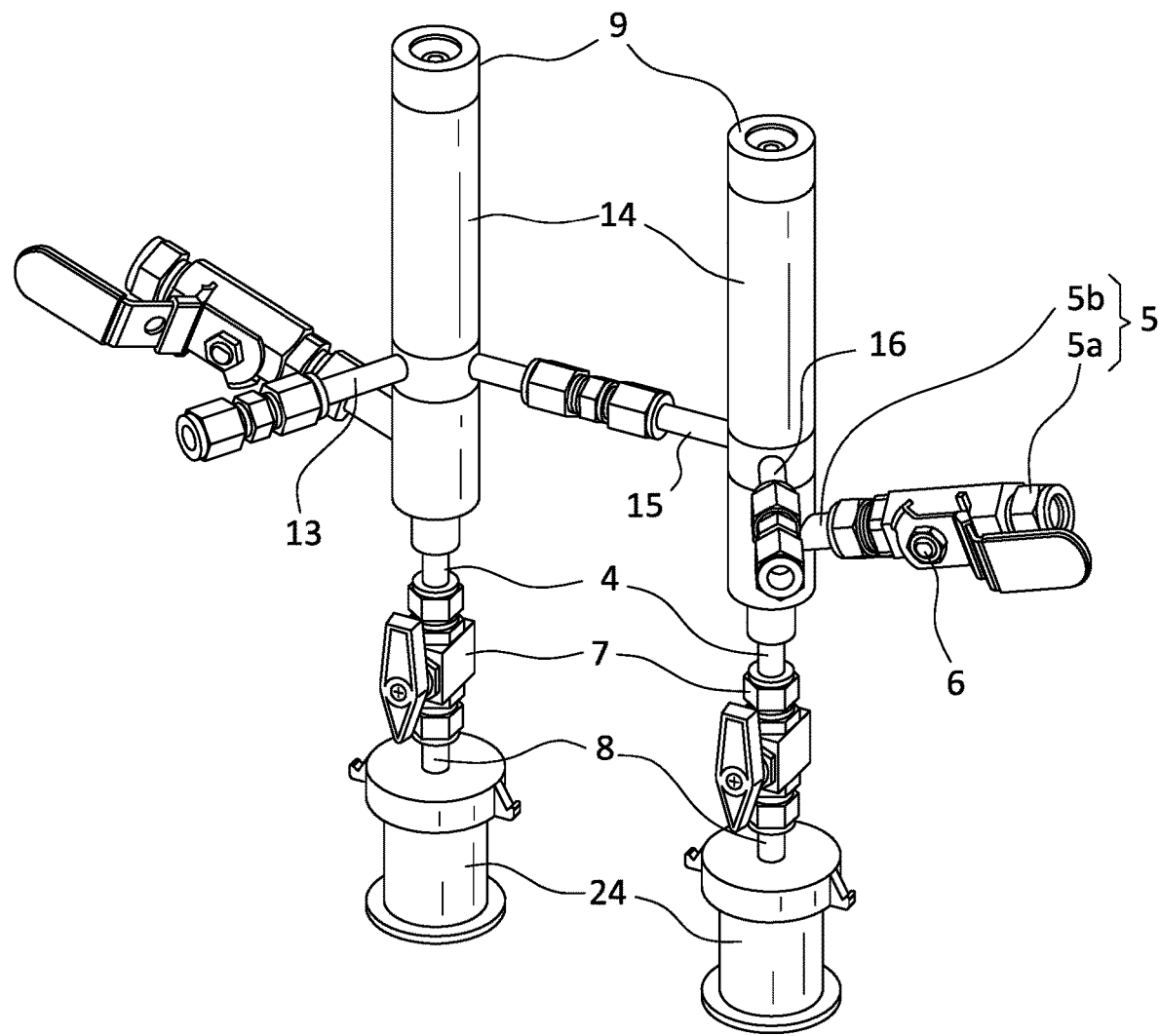
FIGS. 6 to 8 show four different views of a system providing gas inlet tubes for a fluidized bed reactor, the gas inlet tubes being equipped with a system of cooling jackets.
Figure 7:
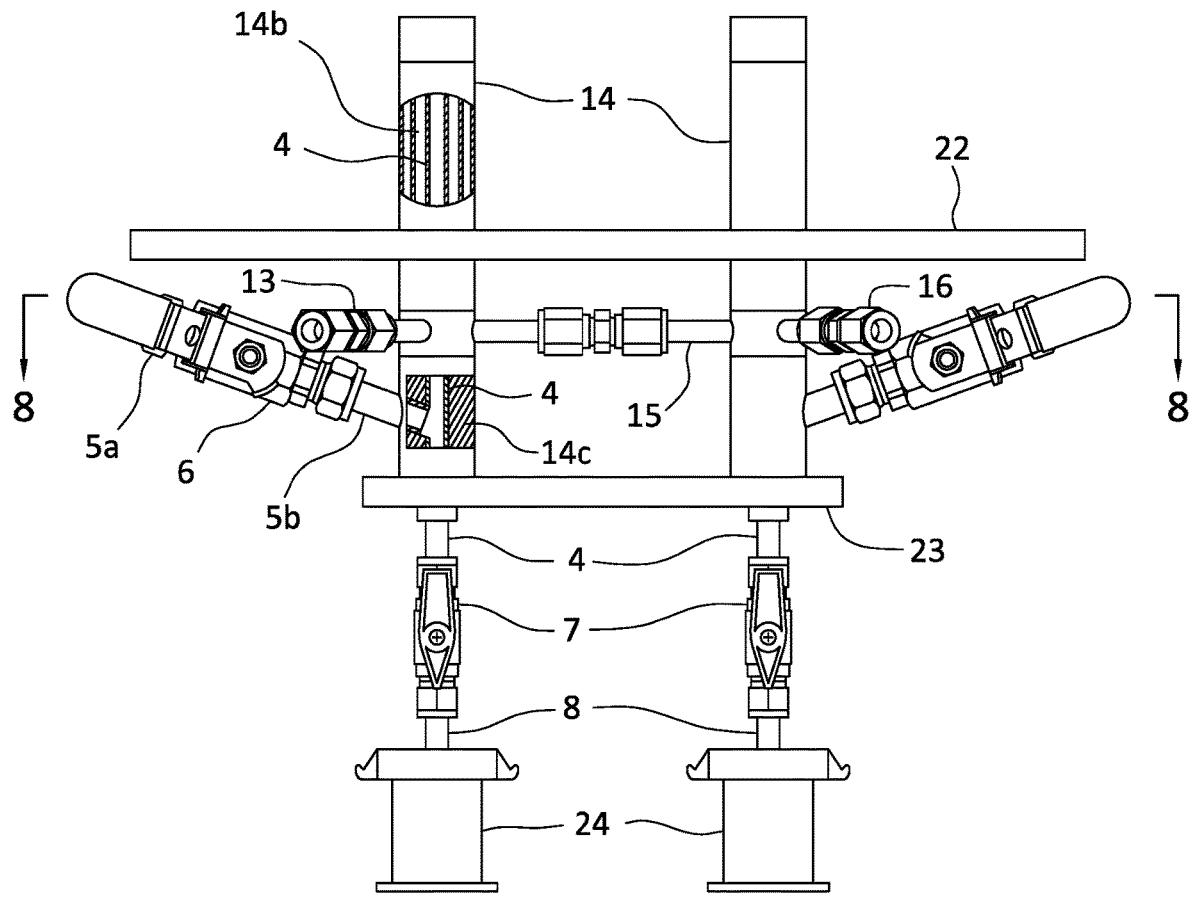

FIGS. 6 and 7 show an assembly containing a set of fluidizing gas inlet tubes and a coolant system, designed to fit in a plenum chamber of a fluidized gas reactor, below a gas distribution plate. In the embodiment of FIGS. 6 and 7, there are two coolant jackets 14. A fluidizing gas inlet tube 4 (shown in FIG. 7) passes through each coolant jacket, carrying a fluidizing gas into a reaction chamber through opening 9 passing through a distribution plate 3 (not shown in FIGS. 6 and 7). A plate 22 (shown in FIG. 7) stabilizes the coolant jackets, holding them in a fixed relative orientation; plate 22 may also be fixed to an inner wall of the plenum chamber.

The lower end of each cooling jacket may terminate at a second stabilizing plate 23 (shown in FIG. 7), which may be anchored to the bottom of the plenum chamber (not shown in FIGS. 6 and 7). The fluidizing gas inlet tubes 4 within each outer coolant jacket 14 lead to a valve 7. When valve 7 is opened, particles from the fluidized bed reactor travel through valve 7 into a particle outlet tube 8, and then fall into a sampling chamber 24.

As seen in FIGS. 6 and 7, a coolant inlet 13 carries a coolant fluid to a first cooling jacket 14. The coolant fluid then travels from the first cooling jacket 14 to a second cooling jacket 14, before exiting the plenum chamber through coolant outlet 16. The coolant then travels between the cooling jackets 14 through tube 15. As seen in FIGS. 6 and 7, fluidizing gas is carried to each fluidizing gas inlet tube 4 through a corresponding fluidizing gas supply tube 5, which may pass through a cooling jacket 14 before intersecting inlet tube 4. Alternatively, as shown in FIG. 7, fluidizing gas supply tube 5 may pass through a solid cylinder 14c before intersecting inlet tube 4, where cylinder 14c is positioned below coolant inlet 13. A valve 6 allows supply of the fluidizing gas to each inlet tube to be temporarily stopped, so that a particle sample can be collected in a corresponding sampling chamber 24 by opening a valve 7.

Figure 8:
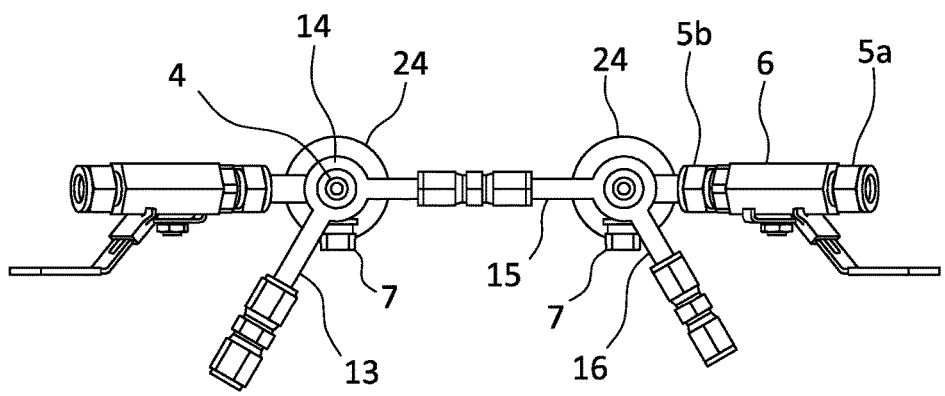

FIG. 8 shows the assembly of FIG. 7, viewed in the direction of arrow 8. In the view of FIG. 8, the upper side of sampling chambers 24 is seen cooling jackets 14. A first cooling jacket 14 has a fluid inlet 13, carrying a coolant fluid into jacket 14. Cooling fluid leaves the first coolant jacket 14 through tube 15 and enters a second cooling jacket 14. The coolant fluid then leaves the second cooling jacket through coolant outlet 16. Each coolant jacket 14 has a fluidizing gas supply tube 4 at its center, so that the temperature of the fluidizing gas is regulated by indirect heat exchange with the coolant fluid. Each fluidizing gas supply tube 4 is supplied with fluidizing gas through a supply tube 5a leading to a valve 6, and then through tube 5b.

Figure 9:
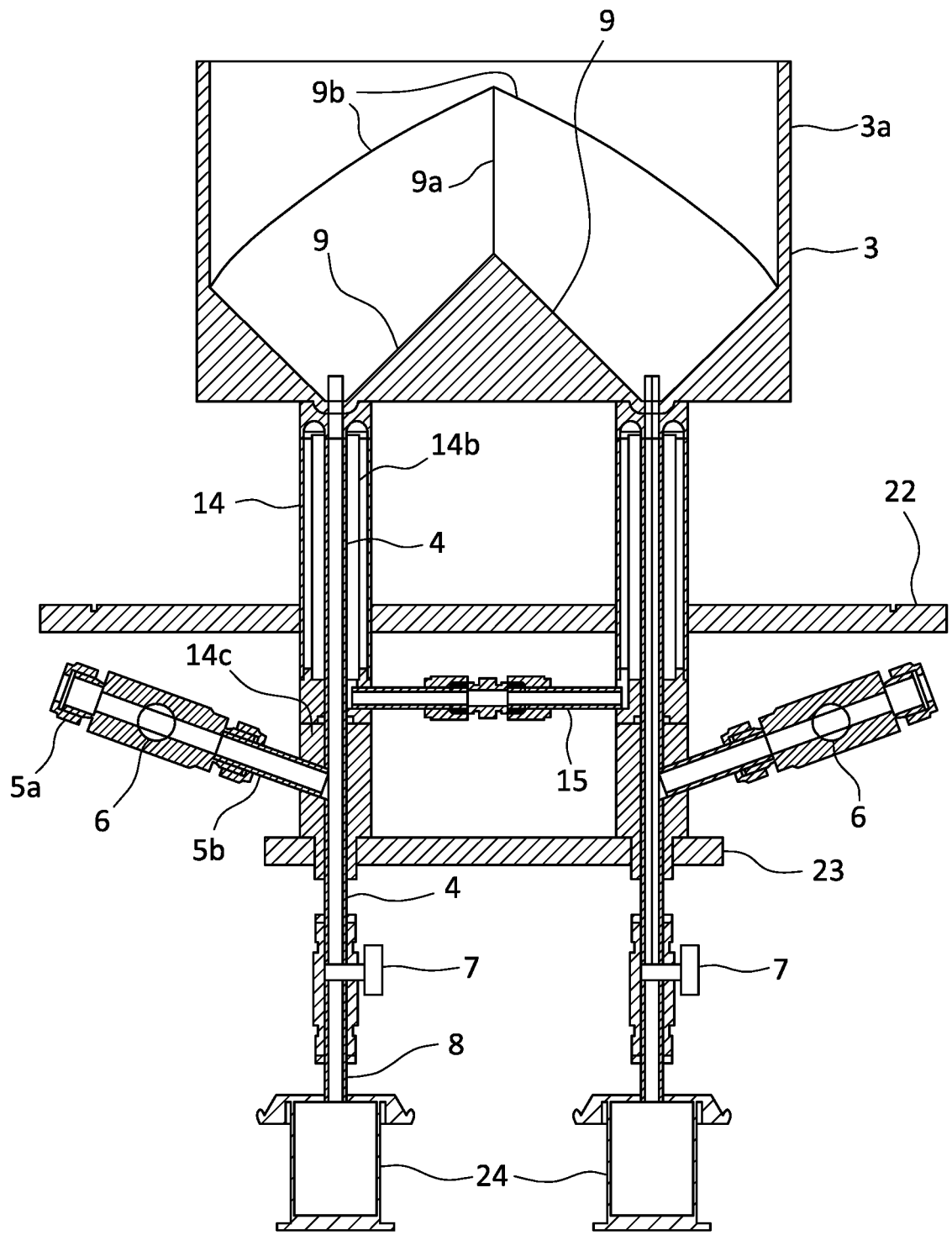
FIG. 9 shows a gas distribution plate in conjunction with the system of FIGS. 6 to 8.

FIG. 9 shows a cross section of the apparatus of FIG. 7, in conjunction with a gas distribution plate 3. As shown in FIG. 9, plate 3 may have a cylindrical wall 3a, and conical gas distribution surfaces 9 surrounding an opening of a fluidizing gas supply tube 4. Adjacent gas distribution holes 9 may contact each other at ridge-shaped edges 9a. The surface of conical gas distribution holes 9 may intersect cylindrical wall 3a at edges 9b.

FIGS. 10A to 10F show various configurations of a gas distribution plate 3, for use with three fluidizing gas supply tubes 4 (FIGS. 10A and 10B); four fluidizing gas supply tubes 4 (FIGS. 10C and 10D); or five fluidizing gas supply tubes 4 (FIGS. 10E and 10F). Each plate has multiple openings, each corresponding to an upper opening of a fluidizing gas supply tubes 4; and conical surfaces 9 surrounding each opening in the bottom of plate 3. Each pair of adjacent conical surfaces 9 intersect at a ridge-shaped edges 9a.

Returning to FIG. 3, reaction chamber 1 has a wall 10 of a conductive material, such as a conductive carbon, e.g., graphite. A fluidizing gas flows through the reaction chamber 1 in the direction of arrow B and exits the reaction chamber through exit tube 1a. As the fluidizing gas flows through the reaction chamber 1, the particles 2 in the particle bed are fluidized. Normally, the particle bed includes particles having a range of particle sizes, including large particles and small particles. As the fluidizing gas flows through the particle bed, the gas flow causes larger particles to move within the particle bed without escaping the surface of the particle bed. However, smaller particles may become entrained in the fluidizing gas stream, as they have greater buoyancy in the fluidizing gas stream. These small particles escape the surface of the fluidized bed and may exit the reactor 1 through tube 1a. This reduces the yield of a reaction between particles in the fluidized bed and a reactant in the fluidized bed and forces the placement of devices for recovery or recycling of small entrained particles at an outlet for tube 1a. It would be advantageous to prevent small entrained particles from entering a fluidized gas exit tube 1a.

3. Disentrainment of Fine Particles

Figure 11:
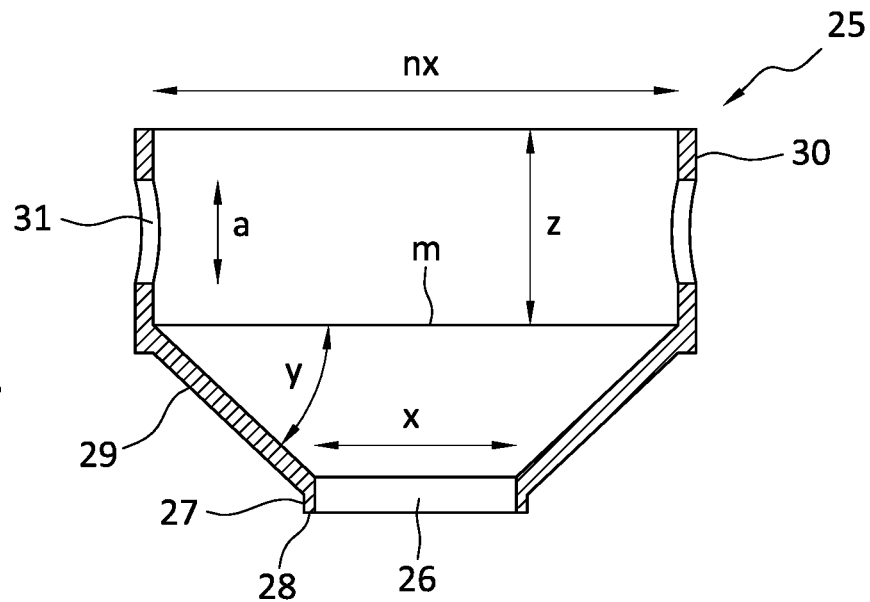
FIG. 11 shows an apparatus to be used in conjunction with a fluidized bed reactor for disentraining fine particles from a fluidizing gas.

FIG. 11 shows an apparatus 25 for recovering small entrained particles from a fluidizing gas stream passing through a tubular fluidized gas reactor. Apparatus 25 is configured to be positioned above a tubular fluidized gas reactor chamber 1. The apparatus 25 includes a lower end with an opening 26 having a diameter x, configured to receive fluidizing gas from a reaction chamber; and a tubular disentrainment chamber 30 above the opening 26 having a diameter nx, where n is between 1.5 and 10. In various embodiments, an inner diameter of the disentrainment chamber is from 1.5 to 10 times greater (n is 1.5 to 10), from 2 to 5 times greater, from 2.25 to 4 times greater, or about 2.5 times greater than a diameter of the reaction chamber. In various embodiments, a conical velocity reduction chamber 29 joins the opening 26 and the velocity reduction chamber, with an angle y between a plane m defining a lower boundary of the disentrainment chamber 30 and the conical inner wall of the velocity reduction chamber 29 being between 15° and 75°, between 25° and 65°, between 30° and 60°, between 40° and 50°, or about 45°. Two openings 31 in the wall of disentrainment chamber 30 allow fluidizing gas to exit the disentrainment chamber 30 after entering the velocity reduction chamber through opening 26.

The rim of opening 26 is defined by a raised lip 28. An indentation 27 is defined by a vertical outer surface of lip 28, and a horizontal surface at a lower edge of the outer surface of the wall of the velocity reduction chamber 29. Lip 28 and indentation 27 are used to fit the apparatus 25 to an upper edge of a reaction chamber 1.

Figure 12:
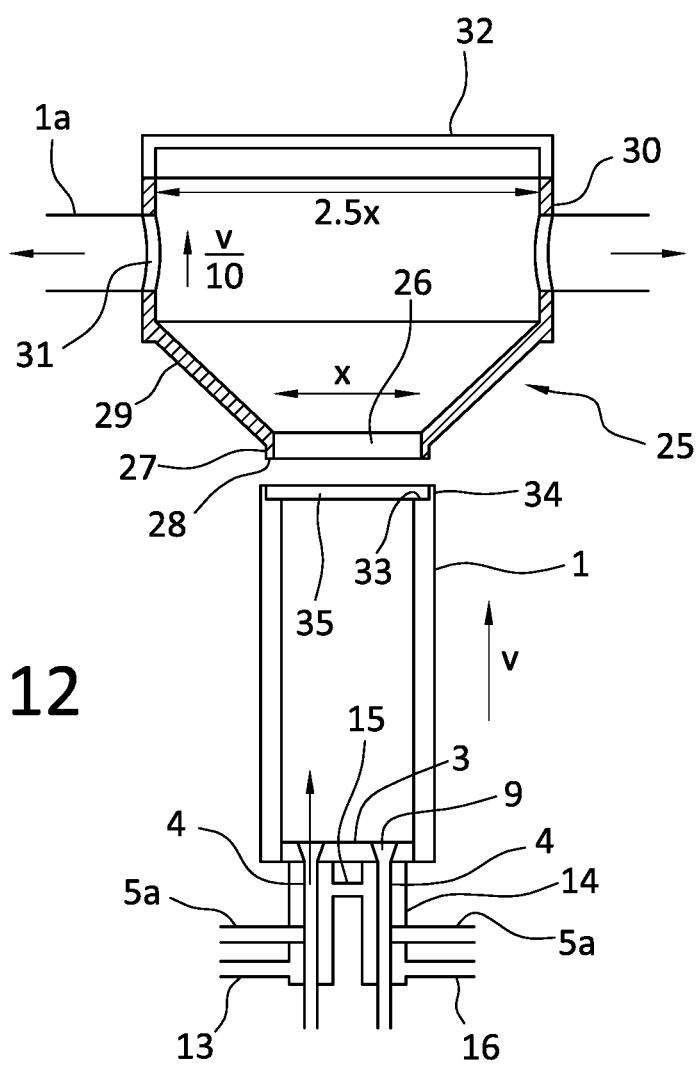
FIG. 12 shows the apparatus of FIG. 10 being used in conjunction with a fluidized bed reactor.

As shown in FIG. 12, the apparatus 25 may be used in conjunction with a fluidizing gas reactor, generally as shown in FIG. 1. The fluidizing gas reactor has a reaction chamber 1 having an opening 35 at its upper end. Around the peripheral edge of opening 35, reaction chamber 1 has an elevated lip 34 which fits into indentation 27 in apparatus 25. Reaction chamber 1 also has an indentation 33 which receives elevated lip 28 in apparatus 25. An opening in the top of apparatus 1 may be closed by a lid 32.

As seen in FIG. 11, a fluidizing gas travels from fluidizing gas supply tube 5a through fluidizing gas inlet tube 4 and enters reaction chamber 1 through openings 9 in gas distribution plate 3. The fluidizing gas then exits the reaction chamber through opening 26 and enters the apparatus 25. In the apparatus 25, the fluidizing gas enters the velocity reduction chamber 29 at a first velocity, carrying entrained fine particles from the fluidized bed in reaction chamber 1. As the fluidizing gas travels through the velocity reduction chamber, the cross sectional area traversed by the gas increases, and the gas velocity decreases until the fluidizing gas exits the velocity reduction chamber 29 and enters disentrainment chamber 30 at a second velocity, which is less than the first velocity. In the apparatus of FIG. 12, the cross-sectional area of the reaction chamber 1 is x, and the cross-sectional area of the disentrainment chamber 30 is 2.5x. As the fluidizing gas travels from the reaction chamber 1 to the disentrainment chamber 30 through velocity reduction chamber 29, the gas velocity is reduced by a factor of 10.

Due to reduced velocity of the fluidizing gas in the disentrainment chamber 30, fine particles entrained in the fluidizing gas as it passes through the reaction chamber 1 become less buoyant in the fluidizing gas in the disentrainment chamber 30. The fine particles thus have a tendency to fall out of, i.e., be disentrained from, the fluidizing gas stream before the gas stream enters exit openings 31. The disentrained particles fall through the velocity reduction chamber 29 into reaction chamber 1. The conical inner surface of velocity reduction chamber 29 helps funnel disentrained particles from disentrainment chamber 30 into reaction chamber 1. After disentrainment of fine particles, the fluidizing gas exits the disentrainment chamber through exit openings 31, entering exit tubes 1a. Exit tubes 1a may carry the fluidizing gas out of the disentrainment chamber 30 directly, as shown in FIG. 12. Alternatively, openings 31 may carry fluidizing gas out of the disentrainment chamber 30 into an outer housing chamber, enclosing reaction chamber 1 and apparatus 25. The fluidizing gas may then exit the outer housing chamber through a set of exit tubes.

Although the various embodiments have been described in detail, with particular reference to certain aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A fluidized gas reactor configured to allow particle sample recovery without interrupting an ongoing reaction, comprising:
   a. a reaction chamber including a particle bed;
   b. a gas distribution plate having a plurality of openings therethrough;
   c. a plurality of vertical fluidizing gas inlet tubes, each of the fluidizing gas inlet tubes being in fluid communication with one of the openings in the gas distribution plate;
      wherein each fluidizing gas inlet tube is configured to receive a fluidizing gas and transport the fluidizing gas to the reaction chamber;
   d. a fluidizing gas source configured to provide a stream of the fluidizing gas to the fluidizing gas inlet tubes; and
   e. a plurality of particle outlets, each particle outlet being positioned in one of the fluidizing gas inlet tubes;
      wherein the fluidizing gas source is configured to selectively stop the stream of the fluidizing gas to any one of the fluidizing gas inlet tubes; and
      wherein each particle outlet is configured to receive particles from the particle bed while the stream of the fluidizing gas to a corresponding fluidizing gas inlet tube is stopped.

2. The fluidized gas reactor of claim 1, wherein the fluidizing gas source is configured to selectively stop the stream of the fluidizing gas to any one of the fluidizing gas inlet tubes without interrupting the stream of the fluidizing gas to the other fluidizing gas inlet tubes.

3. The fluidized gas reactor of claim 1, wherein the fluidizing gas source comprises a plurality of fluidizing gas supply tubes, each fluidizing gas supply tube being in fluid communication with a corresponding one of the fluidizing gas inlet tubes;
   wherein each fluidizing gas supply tube comprises a valve configured to selectively stop the stream of the fluidizing gas to the corresponding fluidizing gas inlet tube.

4. The fluidized gas reactor of claim 1, wherein the fluidizing gas source comprises a plurality of fluidizing gas supply tubes, each fluidizing gas supply tube being in fluid communication with a corresponding one of the fluidizing gas inlet tubes;
   wherein each fluidizing gas supply tube comprises a first valve which is configured to adopt a first position, wherein said first position selectively stops the stream of the fluidizing gas from flowing to the corresponding fluidizing gas inlet tube; and
   wherein the corresponding fluidizing gas inlet tube comprises a second valve configured to allow particles from the particle bed to flow to the particle outlet when the first valve is in the first position.

5. The fluidized gas reactor of claim 4, wherein the first valve is configured to adopt a second position, wherein said second position permits the stream of the fluidizing gas to flow to the corresponding fluidizing gas inlet tube; and
   wherein the second valve is configured to prevent particles from the particle bed from flowing to the particle outlet when the first valve is in the second position.

6. The fluidized gas reactor of claim 1, further comprising:
   f. a coolant system, the coolant system comprising:
      a fluid inlet;
      a plurality of cooling jackets, each cooling jacket surrounding one of the fluidizing gas inlet tubes and being in fluid communication with the fluid inlet; and
      a fluid outlet in fluid communication with each cooling jacket.

7. The fluidized gas reactor of claim 1, wherein the reaction chamber comprises a graphite wall, said graphite wall being configured to be heated to between about 600° C. and about 2200° C.

8. The fluidized gas reactor of claim 1, wherein the fluidized gas reactor further comprises:
   a disentrainment chamber above the reaction chamber; and
   a conical velocity reduction chamber therebetween;
      wherein a diameter of the disentrainment chamber is from 1.5 to 10 times greater than a diameter of the reaction chamber.

9. The fluidized gas reactor of claim 8, wherein the fluidized gas reactor further comprises:
   wherein the diameter of the disentrainment chamber is from 2 to 5 times greater than the diameter of the reaction chamber.

10. The fluidized gas reactor of claim 8, wherein the fluidized gas reactor further comprises:
    wherein the diameter of the disentrainment chamber is about 2.5 times greater than the diameter of the reaction chamber.

11. The fluidized gas reactor of claim 8, wherein:
    the reaction chamber comprises a graphite wall configured to be heated to between about 600° C. and about 2200° C.; and
    at least one of the velocity reduction chamber and the disentrainment chamber comprises a graphite wall configured to be heated to between about 600° C. and about 2200° C.

12. A fluidized gas reactor, comprising:
    a. a reaction chamber including a particle bed;
    b. a gas distribution plate having a plurality of openings therethrough, wherein each opening opens into the reaction chamber;
    c. a plurality of fluidizing gas inlet tubes, each of the fluidizing gas inlet tubes being in fluid communication with one of the openings in the gas distribution plate;

wherein each fluidizing gas inlet tube is configured to receive a fluidizing gas and transport the fluidizing gas to the reaction chamber;

d. a fluidizing gas source, the fluidizing gas source being configured to provide a stream of the fluidizing gas to each fluidizing gas inlet tube individually; and e. a coolant system, the coolant system comprising:
a fluid inlet;
a coolant flow path in fluid communication with the fluid inlet, the coolant flow path being configured to cool each fluidizing gas inlet tube; and
a fluid outlet in fluid communication with the coolant flow path.

13. The fluidized gas reactor of claim 12, wherein:
the fluid inlet comprises an inlet manifold;
the coolant flow path comprises a plurality of cooling jackets, wherein:
each cooling jacket surrounds one of the fluidizing gas inlet tubes; and
each cooling jacket is in fluid communication with the inlet manifold; and
the fluid outlet comprises an outlet manifold in fluid communication with each cooling jacket.

14. The fluidized gas reactor of claim 12, wherein:
the coolant flow path comprises a plurality of cooling jackets, wherein each cooling jacket surrounds one of the fluidizing gas inlet tubes; and
the coolant flow path is configured to provide coolant flow from the fluid inlet to the fluid outlet, wherein the coolant flows sequentially through the plurality of cooling jackets.

15. The fluidized gas reactor of claim 12, wherein:
the coolant flow path comprises a plurality of cooling jackets, wherein each cooling jacket surrounds one of the fluidizing gas inlet tubes; and
the coolant flow path is configured to provide coolant flow from the fluid inlet to the fluid outlet, wherein the coolant flows in parallel through the plurality of cooling jackets.

16. The fluidized gas reactor of claim 12, further comprising:
f. a plurality of particle outlets, each particle outlet being at the lower end of one of the fluidizing gas inlet tubes;
wherein the fluidizing gas source is configured to selectively stop the stream of the fluidizing gas to any one of the fluidizing gas inlet tubes; and
wherein each particle outlet is configured to receive particles from the particle bed while the stream of the fluidizing gas to a corresponding fluidizing gas inlet tube is stopped.

17. The fluidized gas reactor of claim 12, wherein the fluidized gas reactor further comprises:
a disentrainment chamber above the reaction chamber; and
a conical velocity reduction chamber therebetween;
wherein a diameter of the disentrainment chamber is from 1.5 to 10 times greater than a diameter of the reaction chamber.

18. A fluidized gas reactor configured to allow particle sample recovery without interrupting an ongoing reaction, comprising:

a. a reaction chamber including a particle bed;

b. a gas distribution plate having a plurality of openings therethrough;

c. a plurality of fluidizing gas inlet tubes in fluid communication with the one of the openings in the gas distribution plate;
wherein each fluidizing gas inlet tube has a gas inlet opening and a particle outlet opening;

d. a fluidizing gas source configured to provide a stream of a fluidizing gas to the gas inlet openings in the fluidizing gas inlet tubes; and e. a valve system, wherein the valve system is configured to selectively stop flow of the fluidizing gas to the gas inlet opening in any one of the fluidizing gas inlet tubes; and allow flow of particles from the particle bed to the particle outlet opening while flow of the fluidizing gas to the gas inlet opening is stopped.

19. The fluidized gas reactor of claim 18, wherein the valve system is configured to selectively stop flow of the fluidizing gas to the gas inlet opening in any one of the fluidizing gas inlet tubes without interrupting flow of the fluidizing gas to the gas inlet opening in other fluidizing gas inlet tubes.

20. The fluidized gas reactor of claim 18, wherein the valve system does not allow flow of particles from the particle bed to the particle outlet opening unless flow of the fluidizing gas to the gas inlet opening is stopped.

* * * * *

UNITED STATES PATENT AND TRADEMARK OFFICE
CERTIFICATE OF CORRECTION

Page 1 of 1

PATENT NO. : 10,717,061 B1
APPLICATION NO. : 16/453571
DATED : July 21, 2020
INVENTOR(S) : Howard Taery Kim It is certified that error appears in the above-identified patent and that said Letters Patent is hereby corrected as shown below:

In the Specification

On Column 1, Line 4, before the "Background," please insert the following paragraph:
--STATEMENT OF GOVERNMENT SUPPORT
This invention was made with government support under Grant No. DE-NE0008472 awarded by the Department of Energy. The government has certain rights in the invention.--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*